US006552490B1

(12) United States Patent
Cascone et al.

(10) Patent No.: US 6,552,490 B1
(45) Date of Patent: Apr. 22, 2003

(54) MULTIPLE STAGE DEPRESSED COLLECTOR (MSDC) KLYSTRON BASED AMPLIFIER FOR GROUND BASED SATELLITE AND TERRESTRIAL COMMUNICATIONS

(75) Inventors: Michael J Cascone, Sunnyvale, CA (US); Eric Oiesen, Ben Lomand, CA (US)

(73) Assignee: Communications and Power Industries, Palo Alto, CA (US)

( * ) Notice: Subject to any disclaimer, the term of this patent is extended or adjusted under 35 U.S.C. 154(b) by 0 days.

(21) Appl. No.: 09/668,008

(22) Filed: Sep. 21, 2000

Related U.S. Application Data

(63) Continuation of application No. 09/649,479, filed on Aug. 28, 2000, and a continuation of application No. 09/629,315, filed on Jul. 31, 2000, now Pat. No. 6,456,009, and a continuation of application No. 09/574,712, filed on May 18, 2000, now Pat. No. 6,211,657.

(51) Int. Cl.[7] .............................................. H01J 25/00
(52) U.S. Cl. ............................................... 315/5.38
(58) Field of Search .......................... 315/5.38, 5.39, 315/1, 3, 3.5

(56) References Cited

U.S. PATENT DOCUMENTS

| 3,644,778 | A | | 2/1972 | Mihran et al. ............. 315/5.38 |
| 3,702,951 | A | | 11/1972 | Kosmahl ................... 315/5.38 |
| 4,387,323 | A | | 6/1983 | Berwick .................... 315/5.35 |
| 4,395,656 | A | * | 7/1983 | Kosmahl ....................... 315/4 |
| 5,420,478 | A | | 5/1995 | Scheitrum ................. 315/5.38 |
| 5,550,432 | A | | 8/1996 | Barker ......................... 315/5 |
| 5,568,014 | A | * | 10/1996 | Aoki et al. .................. 315/3.5 |
| 5,952,785 | A | * | 9/1999 | Komm et al. ................ 315/3.5 |

FOREIGN PATENT DOCUMENTS

GB         2 326 274 A        12/1998

OTHER PUBLICATIONS

Kosmahl, H., "Modern Multistage Depressed Collectors—A Review", *Proceedings of the IEEE*, vol. 70, No. 11, pp. 1325–1334, New York, US (1982).
Nakagawa, H. et al., "22 GH$_z$ 200 W TWTA$_s$ For Future Broadcasting Satellites", NHK Laboratories Note, Serial No. 407, pp. 1–10, Tokyo, Japan (1992)

* cited by examiner

*Primary Examiner*—David Hung Vu
(74) *Attorney, Agent, or Firm*—Thelen Reid & Priest; David B Ritchie

(57) ABSTRACT

A klystron tube for amplifying signals at microwave radio frequencies utilizes an electron source for emitting electrons through a field focused by a high energy magnet in the RF section of the tube. After the electrons have passed through the active area of the tube, the electrons strike the collector which, in this case, is a multistage depressed collector. The multistages of the depressed collector are connected to high energy voltage sources of different potentials. The klystron tube with the multistage depressed collector is uniquely used here for the first time in a ground based satellite or terrestrial communications system.

16 Claims, 8 Drawing Sheets

MULTIPLE STAGE DEPRESSED COLLECTOR (MSDC) KLYSTRON BASED AMPLIFIER FOR GROUND BASED SATELLITE AND TERRESTRIAL COMMUNICATIONS

CROSS-REFERENCE TO ASSOCIATED APPLICATIONS

This application is a continuation of application Ser. No. 09/629,315, filed Jul. 31, 2000, entitled "Adaptive Heater Voltage Algorithm And Control System For Setting And Maintenance Of The Heater Voltage Of A Vacuum Electron Device now U.S. Pat. No. 6,456,009"; application Ser. No. 09/574,712, filed May 18, 2000, entitled "Two Stage Power Converter With Interleaved Buck Regulators"now U.S. Pat. No. 6,211,657; and application Ser. No. 09/649,479, filed Aug. 28, 2000, entitled "Gun-Only Magnet Used For A Multistage Depressed Collector Klystron"; all of which are herein incorporated by reference.

BACKGROUND

1. Technical Field

This invention relates to a multistage depressed collector (MSDC) klystron based amplifier, and more particularly to an MSDC klystron for use in ground based satellite and terrestrial communications.

2. Description of Background Art

Klystron tubes are known devices used for high power transmission of microwave signals. Klystrons are used typically in terrestrial transmission of radio frequency signals, such as for VHF or UHF transmission of radio and television signals. Klystrons also have use in uplink paths in ground to orbiting satellite systems.

There is a continuing effort to make klystron tubes more efficient as well as smaller with the same or increased output power. Heat loss, as well as power loss due to inefficient tube operation, is under continuous scrutiny. Multistage depressed collector tubes have been discussed in the prior art. U.S. Pat. No. 4,395,656, issued Jul. 26, 1983, is entitled Gyrotron Transmitting Tube. This patent discloses an R.F. transmitting tube and a multistage depressed collector to capture spent, spinning or orbiting electrons from a magnetic focusing area. It is the resonance due to the electrons in the magnetic field that determines the frequency of the output of the gyrotron tube. Marrying the MSDC technology in a high power uplink klystron tube suitable for satellite and terrestrial communications above 1 GHz, however, has been an unreached goal.

SUMMARY

The present invention relates to a high-power output vacuum electron device for use in a ground based satellite or terrestrial communications system. The invention includes a cathode for emitting a supply of electrons and an anode for attracting electrons, with the anode being constructed to allow electrons to pass through the anode. An RF generator circuit in the path of the electron beam generates RF signal energy in the presence of the high-voltage power source. A magnet surrounds the anode and the RF generation circuit for focusing the electrons into a collimated beam. A collector receives a collimated electron beam and returns the collected electrons to the cathode. The collector is a multistage depressed collector and the vacuum electron device is a klystron. Another embodiment of the invention includes the ground based satellite or terrestrial communications system with a klystron in with a multistage depressed collector, and further including a power supply for supplying power to the klystron, and a control system for controlling the operation of said ground based satellite or terrestrial communications system, power supply, and klystron. A predistortion linearizer may be used for linearizing the output of the klystron. The system also may include a block upconverter for accepting radio frequency input at an intermediate frequency and of converting the intermediate frequency to the microwave frequency for amplification by the klystron. An electronic control for the beam voltage to the klystron is also included for allowing beam voltages lower than nominal to decrease power consumption when the klystron is not at full output power.

BRIEF DESCRIPTION OF THE DRAWINGS

For a more complete understanding of the embodiments of the invention herein, reference may be had to the following detailed description in conjunction with the drawings wherein.

Figure 1:
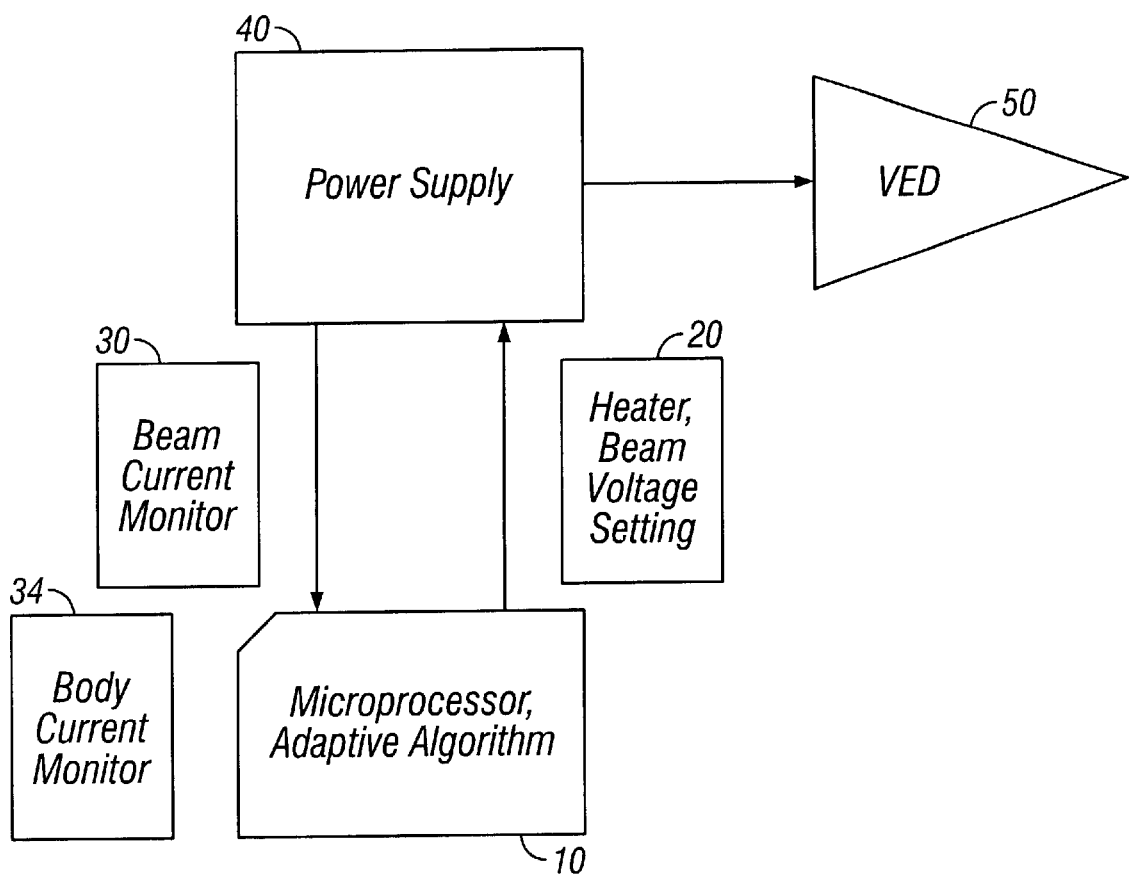
FIG. 1 is a block diagram of a klystron based amplifier for a ground based satellite and terrestrial communications system including the aspects of the embodiments of the present invention.

Reference numbers refer to the same or equivalent parts of the present invention throughout the various figures of the drawings.

DETAILED DESCRIPTION

Those of ordinary skill in the art will realize that the following description of the present invention is illustrative only and not in any way limiting. Other embodiments of the invention will readily suggest themselves to such skilled persons having the benefit of this disclosure.

The invention disclosed herein relates to the use of a multistage depressed collector (MSDC) klystron based amplifier, and more particularly to an MSDC for use in ground based satellite and terrestrial communications. Klystron tubes are in the family of electron tubes called drift-space tubes. Klystrons are used as amplifiers at microwave frequencies and also as oscillators. In klystrons, the velocities of electrons emitted from the cathode are modulated to produce a density-modulated electron beam. A klystron utilizes a number of cavities where the electrons are accelerated and modulated. Then the electrons are captured and returned to the circuit. A gyrotron, on the other hand, utilizes electron resonance in a magnetic field to determine the output frequency rather than the cavity structure as in a klystron.

Klystrons are advantageous to gyrotrons as adding more cavity stages which increases the efficiency, with less waste heat and without sacrificing the amount of power output that can be achieved, or the linearity of the amplifier driving the klystron. Further, increasing the number of collector stages in the collector of the klystron adds to the efficiency of the tube and the system it is in because the electrons are more accurately collected, cause less secondary emissions, and less cooling is necessary due to the more even collection for the arriving electrons. This increase in operating efficiency is achieved without increasing the beam voltage. Such a system as described herein has not been achieved previously for use in ground based satellite or terrestrial communications systems.

Commercial satellite communications uplinks primarily occur in three bands at 6 GHz, 14 GHz, and 18 GHz. Many other bands exist dispersed between 1 and 3 GHz and at 30 GHz, 44 GHz, and higher frequencies. A typical commercial satellite communications application using an MSDC klystron amplifier requires 2–3 kW of RF output power. Corresponding to this RF output power, the amplifier's high voltage power supply must provide the MSDC klystron with approximately –9 kV beam voltage (relative to ground) and 1A of beam current in addition to individual collector voltages which range between ground and beam voltage. As the RF output power is varied from 0 to saturated RF, the amount of current received by each collector stage varies, which places an RF dependent load against the amplifier's power supply. As the RF output power is varied from 0 to saturation, the amplifier's AC power draw varies between 6 kW and 8 kW. This power draw includes the klystron, klystron and auxiliary cooling, amplifier control system, and RF preamplifier. This is an improvement over the analogous grounded collector klystron amplifier that would constantly draw 12 kW (AC prime power) over the same output power range. The MSDC klystron based amplifier enjoys other improvements such as less waste heat and an overall size that is over one half smaller than the analogous grounded collector klystron amplifier.

Terrestrial communications frequency band allocations are too numerous to list completely here, but many are dispersed between 1 and 3 GHz (L and S-band), and in several bands above 20 GHz. A typical terrestrial communications application in either L or S-band using an MSDC klystron amplifier requires 3 kW of RF output power from an amplifier whose klystron is capable of producing 10 kW. Corresponding to this RF output power, the amplifier's high voltage power supply must provide the MSDC klystron with about –14 kV beam voltage (relative to ground) and 2A of beam current in addition to individual collector voltages which range between of ground and beam voltage. As the RF output power is varied from 0 to 3 kW, the amount of current received by each collector stage varies, which places an RF dependent load against the amplifier's power supply. As the RF output power is varied from 0 to 3 kW, the amplifier's AC power draw varies between 14 kW and 18 kW. This power draw includes the klystron, klystron and auxiliary cooling, amplifier control system, and RF preamplifier. This is an improvement over the analogous grounded stage collector klystron amplifier that would constantly draw 46 kW (AC prime power) over the same output power range. The MSDC klystron based amplifier enjoys other improvements such as less waste heat and an overall size that is two-thirds smaller than the analogous grounded collector klystron amplifier.

A variant of the MSDC klystron, called an MSDC extended interaction klystron (MSDC-EIK), can be used for satellite uplink or terrestrial communications typically at frequencies above 20 GHz that require broad instantaneous bandwidth (>100 MHz, up to on the order of 1 GHz).

The amplifier design takes into account several unique aspects of the MSDC klystron. Adjacent RF assemblies must be spaced to avoid magnetic interference that can cause an increase in klystron body current. The power supply and control system have been designed to keep the amplifier "on the air" in case of minor transient high voltage arcs that may occur in the klystron's collector. The switch mode power supply has been designed to remain stable and well-regulated when presented with the MSDC klystron's wide range of collector loads as is seen when comparing low RF output operation to saturated RF output operation.

The amplifier design includes features not before found on klystron based satellite uplink or terrestrial amplifiers. One such feature is support for a pre-distortion linearizer that is used in conjunction with the klystron to create a more linear amplifier. Another such feature is support for the block upconverter (BUC). The BUC accepts RF input at an IF frequency and upconverts it to the microwave frequency that the klystron then amplifies for transmission.

The amplifier design includes electronic control of the beam voltage—operating the klystron and beam voltages lower than nominal will decrease power consumption and are an option if the amplifier is not being run a mode where full output power is required. Power Saver is the feature name for manual setting of the beam voltage; Power Tracker is the feature name for the adaptive setting of the beam voltage based on a fixed output backoff. Power Tracker will automatically adjust beam voltage and the input attenuator setting based on RF input drive level. Normally, this means lower levels for "clear sky" situations, and higher levels for rainy weather. While Power Tracker is optimized for most operating conditions, the user can override the beam voltage settings manually if desired. Power Saver is designed to minimize phase change and maintain signal lock. There are two modes of operation for the Power Saver. In the "Beam Voltage Control" mode, beam voltage is set to any discrete voltage within the (typical) 2 kV operating range. Full computer control of all operating parameters is available and the computer can interrogate the KPA at any time for status or the level of any parameter, including beam voltage. In this mode the voltage ramp rate is between 300 and 50 volts per second. In Power Tracker, control of the beam voltage is automatic. The user simply sets the KPA to the preferred operating conditions, enables Power Tracker, and from that point on the beam voltage and input attenuator setting are automatically optimized, based on the operator's required output power level as indicated by the upconverter drive to the KPA. For instance, if the HPA is set for an output power of 100 watts (with a beam voltage of 6.5 kV, a klystron RF drive level of 5.0 mw and an input attenuator setting of 12 dB) and the upconverter output is increased by 3 dB, the HPA output power will immediately increase to 200 watts and the beam voltage and input attenuation level will slowly increase (while maintaining an RF output level of 200 watts). The Beam Voltage will increase to approximately 7.1 kV and the input attenuation setting will increase to approximately 15 dB, which will reset the klystron drive level to 5.0 mW. In this mode the voltage ramp rate is between 10 and 40 volts per second. Operating the HPA at reduced beam voltage has several other advantages. In addition to the savings from lower utility cost, other benefits will be:

Expected longer klystron life in some cases

Reduced demand on Earth Station uninterruptable power supply (UPS).

FIG. 1 is a block diagram of a microprocessor system used to implement the power system for a vacuum electron device such as a klystron tube. The microprocessor 10 could be part of a personal computer or other general purpose or special purpose computer operating under control of an operating system utilizing a hard disk drive or other memory device from which the operating system is loaded into random access memory and on which application software and other data are stored. Such a personal computer system could have the well-known Windows® operating system under the control of a Pentium® microprocessor with accompanying memory. Other computers with different operating systems and microprocessors could work as well, however, as would be clear to those of ordinary skill in the art. In the klystron VED system disclosed herein, the program contents are stored in a flash RAM (random access memory) and runs on the amplifier's embedded control system.

A beam current monitor 30 monitors the beam current generated by power supply 40 and delivered to the klystron tube 50, a vacuum electron device, VED. Depending on the beam current as monitored, the adaptive algorithm stored in the computer in which microprocessor 10 is installed will signal the power supply 40 to increase or decrease the beam voltage setting as necessary. Increasing or decreasing the heater beam voltage 20 setting will increase the beam current to the VED filament as set forth herein.

Figure 2:
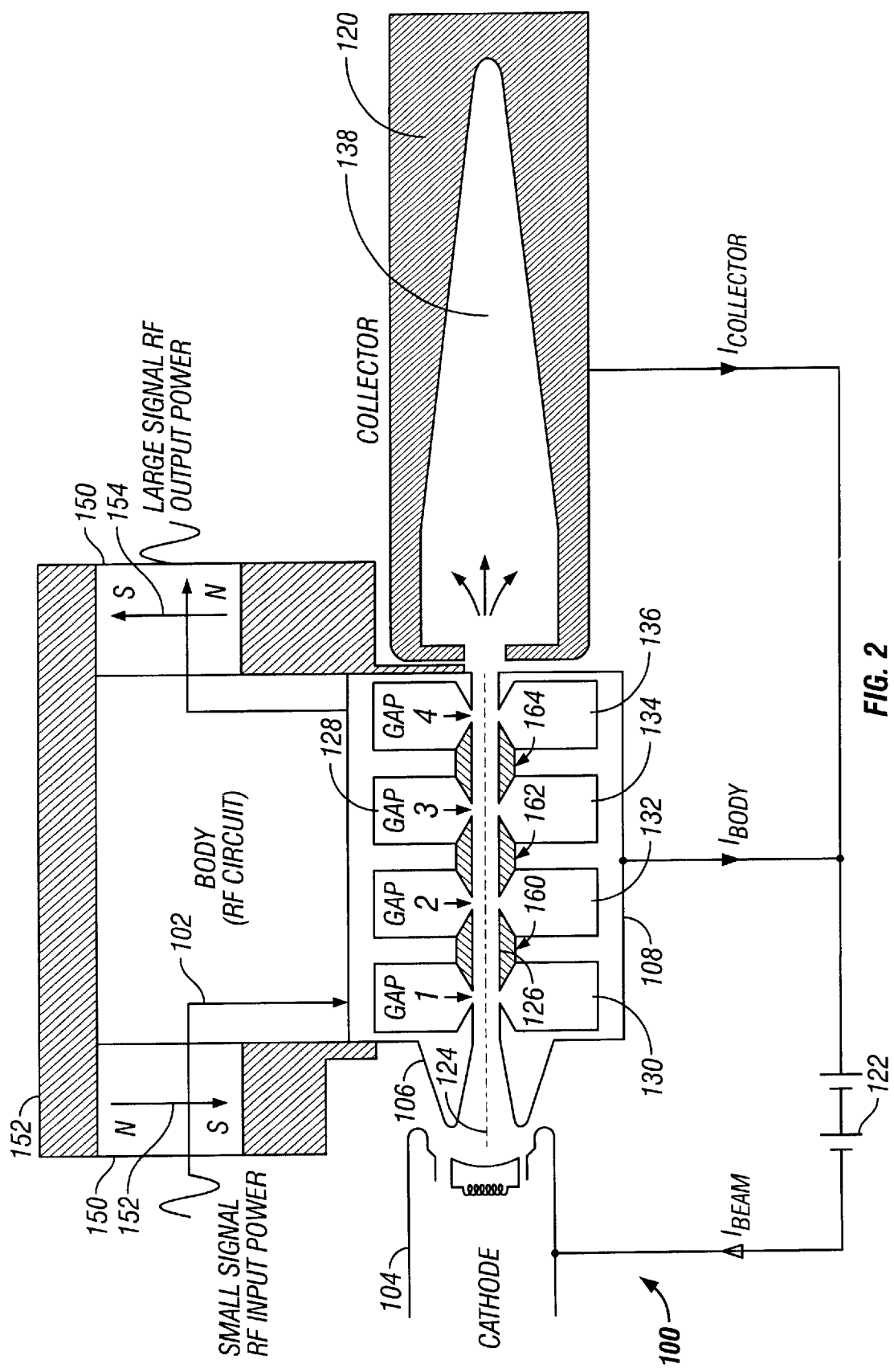
FIG. 2 is a side, schematic representation of a typical klystron tube.
Figure 10:
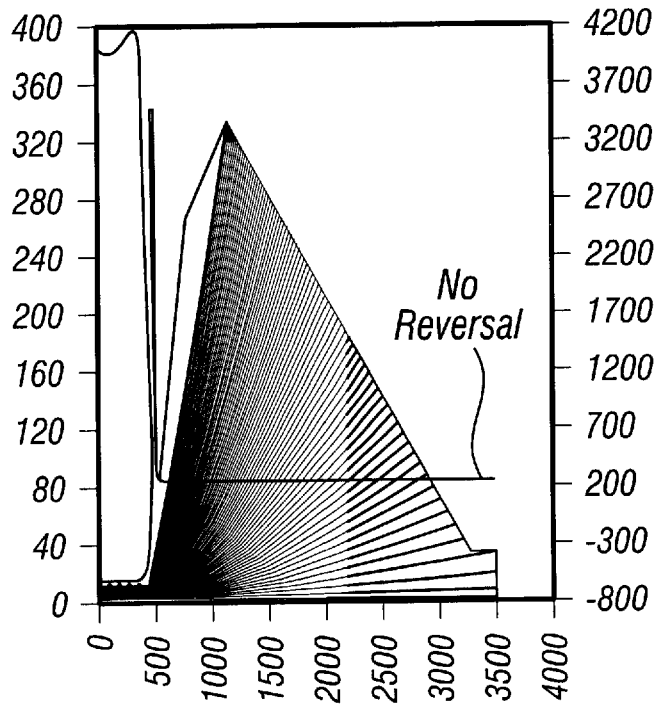
FIG. 10 is a drawing simulation of electrons entering the collector region in the absence of a magnetic field reversal in a gun-only permanent magnetic system as set forth in conjunction with FIG. 3.

The klystron tube 100 in FIG. 2 is a device for amplifying signals 102 at microwave radio frequencies. The high velocity electron beam emitted from the cathode 104 passes through the anode 106 and into the RF interaction region 108. An external magnetic field is employed to prevent the beam from spreading as it passes through the klystron. Magnet 150 supplies the strong magnetic field 152, 154 in a clockwise direction as FIG. 10 is viewed. Magnet 150 is cylindrical and surrounds parts of the cathode, anode, and parts of the collector, but only a top section view of the magnet is shown for clarity. At the other end of the klystron, the electron beam impinges on the collector electrode 120, which dissipates the beam energy and returns the electron current to the beam power supply 122.

The electron emitter or cathode 104 is often referred to as an electron gun. Its purpose is to provide the beam of electrons 124 with a high kinetic energy. This kinetic energy will be partially converted to RF energy in the RF section of the klystron. The quality of the electron beam is a fundamental determinant of the klystron operational effectiveness.

Cathode 104 emission (beam current 124) at a given beam voltage 122 is dependent on the surface temperature, which must be about 1050° C. to achieve the correct level of beam current. The beam shape will probably be incorrect if the surface is too cold, and the life of the tube is reduced if it is too hot. When the cathode has reached the required temperature for electron emission, a voltage is put across the cathode to anode spacing. This voltage causes the electrons to be accelerated towards the body assembly. The electron trajectories are electrostatically focused into a collimated beam when launched from the cathode. This electrostatic focusing is achieved through the careful shaped selection of a focus electrode and the anode electrode 106.

The repulsive force between the electrons in the beam will cause the beam to diverge. A magnetic field of the appropriate strength will keep the beam 124 collimated during its transit through the RF circuit. The magnetic field lines developed by the magnet must be parallel to the axis of the electron beam and the drift tubes 160, 162, 164 along the RF circuit so the electron beam will travel through the drift tubes in a straight line. A typical field strength requirement for a klystron utilized in an uplink satellite system may be in the range of 2500 to 5500 gauss.

The magnetic circuit, as part of magnet 150, surrounding the body of the klystron is typically comprised of four permanent magnets (gaps 1 to 4) mounted together with high-grade steel components. The structure is magnetized so that the magnetic flux from both halves of the circuit combine in parallel across the body gap.

After passing through the body assembly 108, the electron beam 124 has to be captured. The function of the collector 120 is to dissipate the energy of the electron beam 124 after it has passed through the output cavity. The collector is a shaped electrode that is typically shielded from most magnetic fields. As the beam leaves the body and enters collector 120, the absence of the magnetic field allows the beam to spread in chamber 138 due to the electrostatic 'space charge' forces. The beam strikes the collector surface and its kinetic energy is converted to heat. The heat is conducted to cooling fins and expelled with forced air cooling.

The RF interaction region 108, where the amplification occurs, contains resonant cavities 128 and field free drift spaces as guided by drift tubes 160, 162, 164. The first resonant cavity 130 encountered by an electron in the beam 124 is excited by the microwave signal 102 to be amplified, and an alternating voltage of signal frequency is developed across the gap.

An analogy can be made between a resonant cavity and a conventional LC circuit. The cavity gap corresponds to the capacitor, and the cavity walls volume to the inductance. If the cavity is just the right size, it will resonate at the desired frequency. At resonance, opposite sides of the gap becoming alternately positive and negative at a frequency equal to the microwave input signal frequency 102.

In the first cavity 130, the input signal 102 appears as a varying voltage across the drift tube tips which will accelerate or decelerate the electrons in the gap 126 depending on the polarity of the voltage at any given moment. This velocity modulation of beam leads to bunches of electrons. There are two bunching cavities 132, 134 that are tuned in such a way that the bunching is reinforced, increasing the RF energy carried by the beam. The output of the klystron 100 is a load on the output cavity 136 such that the beam is demodulated and the energy of electrons is transferred to the output signal.

Most klystrons utilize a standard large single collector for receiving the beam electron flow and returning it to the cathode, Such a klystron is typically shown in FIG. 2 as described above. The electrons ideally are introduced into the collector 120 and the intent is to eliminate the magnetic field in the collector to allow the electron beam 124 to disperse from its narrow beam due to the natural repulsive nature of each electron on the others. Once the electrons reach the collector chamber 138 with the magnetic fields removed, the electrons should disperse and impinge on the internal walls of the collector chamber 138 and pass back to the cathode 104.

Figure 3:
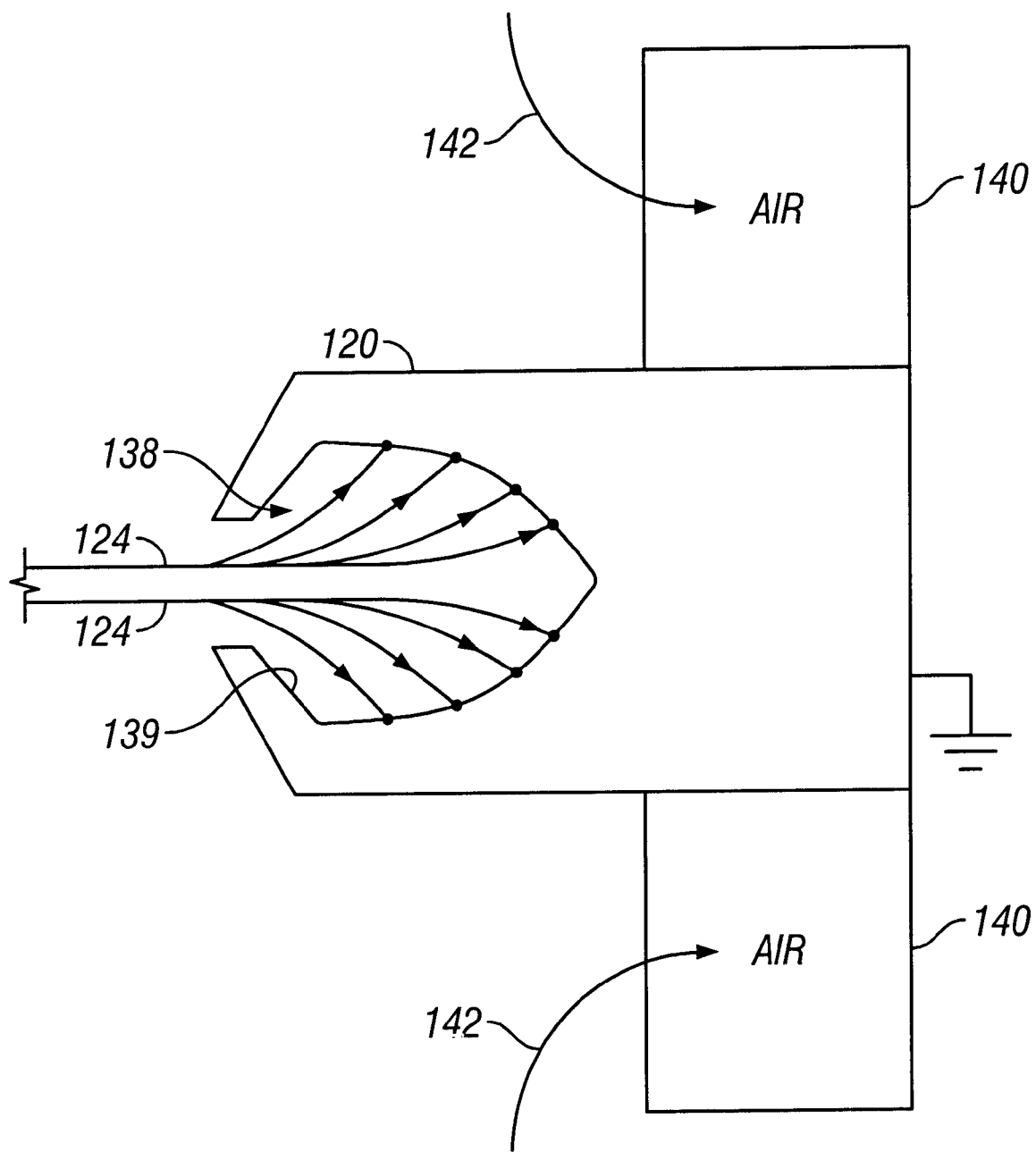
FIG. 3 is a side, schematic view of a klystron collector where electrons are entering the collector chamber in the absence of a magnetic field reversal.

In an ideal situation, the electron flow 124 enters the collector chamber 138 of the collector 120 as seen in FIG. 3. As the electrons enter the chamber 138 and the magnetic field is removed, the natural electrostatic repulsion of the electrons will cause them to scatter to impinge upon the walls 139 evenly as shown internally of the chamber in FIG. 8. The fins 140 are shown for cooling, with air 142 forced over the fins 140 to remove the heat caused by the energy of the impinging electrons being converted from kinetic energy to heat energy.

Figure 4:
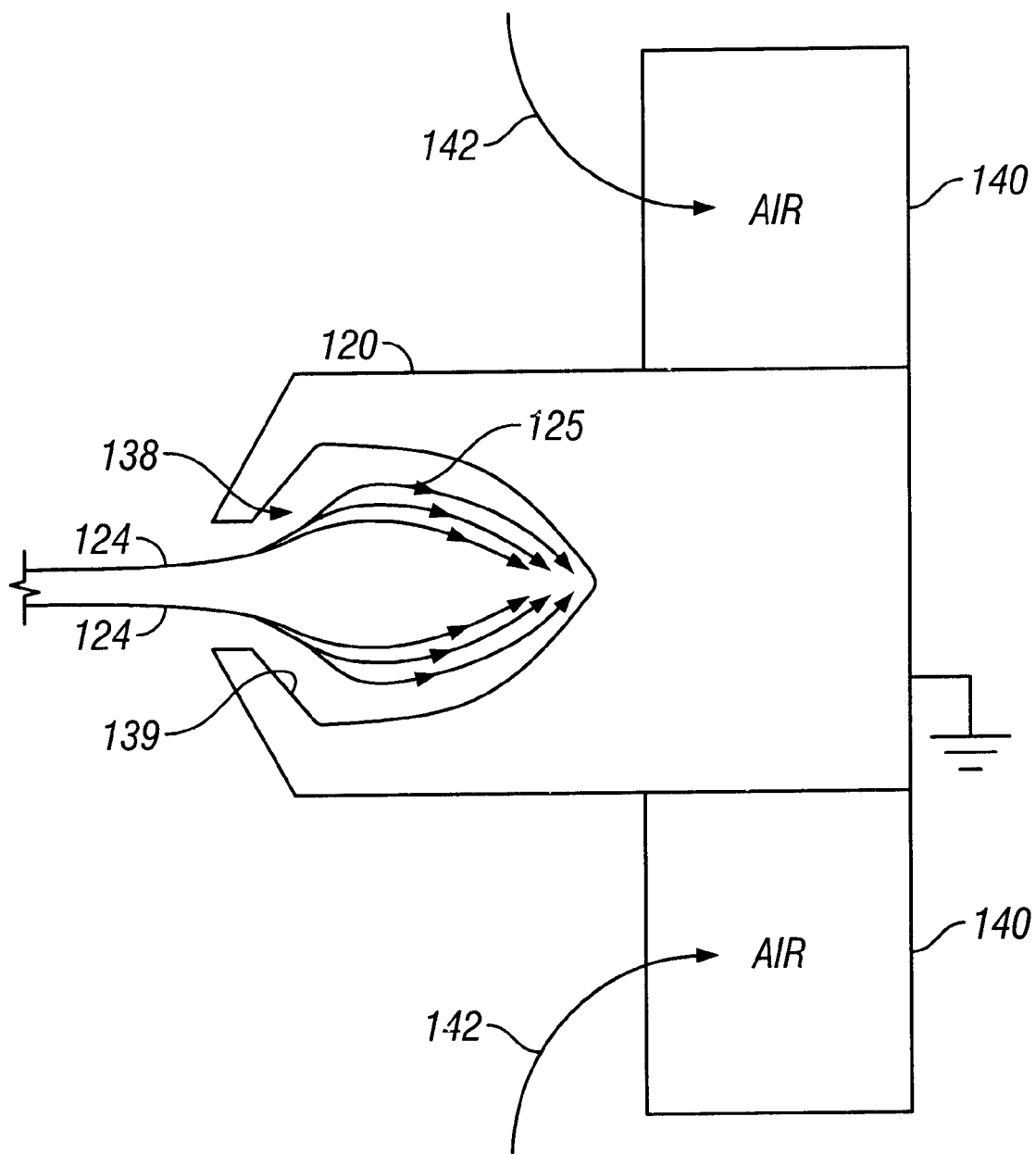
FIG. 4 is a side, schematic view of a klystron collector where electrons are entering the collector chamber in the presence of a magnetic field reversal.

In an actual collector for a klystron, there is normally some extraneous magnetic field action within the chamber 138 defined internally of the collector 120 as seen in FIG. 4 no matter how effective the shielding. While it is not intended generally for the chamber 138 of the klystron collector 120 to be affected by the magnetic field, the prior art has not been successful in eliminating the effects of the magnetic flux reversal at the point where the electron beam enters the chamber 138 of the collector 120. The electron path 124 in FIG. 4 does not result in a pure fan shaped dispersion of the electron beam as seen in FIG. 3, but the electrons have a tendency to be refocused again within the collector chamber 138 by the flux reversals of the magnetic field, although unintended. FIG. 4 shows that the electron beam 124 is not evenly dispersed 125 in the collector 120, but has a tendency to refocus the beam so that it is collected in a smaller area of the chamber, shown to be accumulated at the inner end of chamber 138. With the electrons impinging on the collector in a smaller area, a designer must take into effect the possibility of hot spots caused by an over abundance of impinging electrons in that one area.

A technique for improving the collection of electrons in high energy tubes in order to disperse the heat more efficiently and to recover more energy from the electron beam is to use a multistage depressed collector (MSDC). In the "Proceedings of the IEEE", Volume 70, No. 11, November, 1982, multistage depressed collectors were discussed for use in high energy tubes. In a multistage depressed collector tube, separate collectors in series in the collector area of the tube are connected to high energy voltage sources of different potentials in order to intercept electrons of various kinetic energies. That is, with the independent collectors receiving predetermined energy electrons, the heat caused by electron impingement is spread out among the separate collectors. However, the effects of the magnetic field reversals of the magnetic field in the area of the multistage collector are still manifest.

Figure 5:
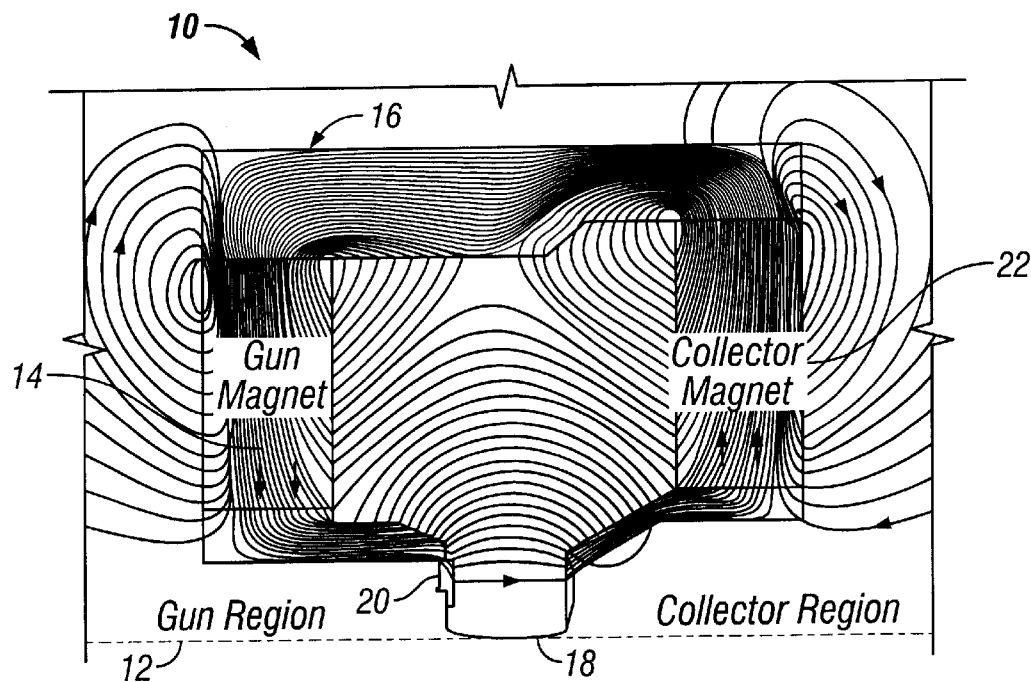
FIG. 5 is a schematic diagram of a section through a conventional permanent magnet system used on a klystron tube.

FIG. 5 shows a conventional permanent magnet arrangement 10 for use in a typical klystron tube. The line 12 at the bottom of FIG. 5 is actually the centerline of the magnet depicted. That is, the magnet 10 shown in FIG. 5 is actually circular about the centerline with only a plan section view of one-half of the magnet illustrated. On the left side of the magnet is the area 14 of the magnet that is used to initially begin the focusing of the electron beam into a narrow pencil beam. The direction of the magnetic field at the area of the magnet adjacent the gun magnet 16 is toward the bottom of the magnet with the magnetic fields returning in the drawing to the other pole of the magnet at the top of FIG. 5. The electrons are confined along the centerline 12 of the high-energy tube by the magnetic flux field allowing for improved energy recovery of the electron beam.

As the electron beam moves from left to right, the permanent magnet also has a magnetic field 18 which traverses the opening 20 at the area where the electron beam is modulated in order to generate the desired high energy microwave signal. As the electrons continue moving past the active part of the high energy tube, the electrons enter the collector region 22 for collection of the electrons as described above. Here also the magnetic field at the collector area has the magnetic field in the opposite direction so that the magnetic field passes upwards from one pole to the other and circulates in a clockwise direction as shown in FIG. 5.

Figure 6:
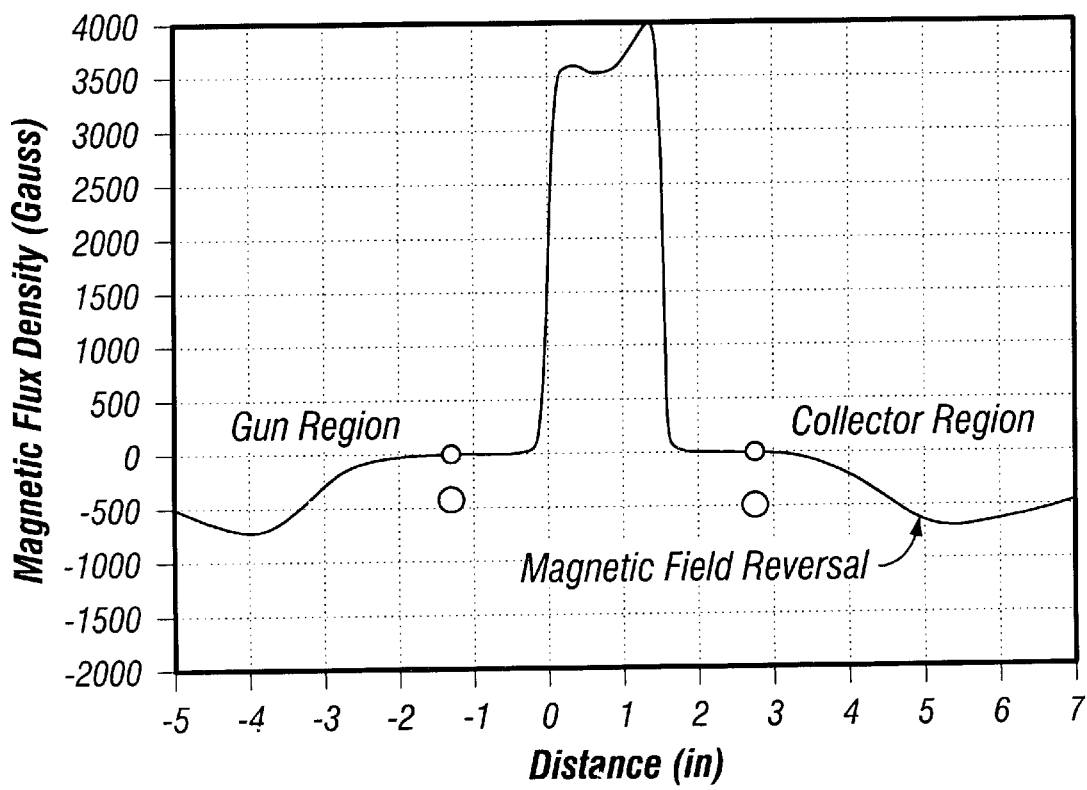
FIG. 6 is a drawing of magnetic flux density versus distance along the centerline of the axis of a conventional permanent magnet on-axis klystron tube.

FIG. 6 is a curve outlining the magnetic flux density of the magnet 10 described above in conjunction with FIG. 5. On the left in FIG. 6, the magnetic field begins the focusing effect of the magnetic field on the electron beam. As the electron beam passes the active energy section 18 of the tube, the effect of the two magnetic fields is highest there, as intended, in order to generate as much RF energy as the tube is designed for. As the electron beam continues to the right in FIG. 6, mirroring FIG. 5, the electron beam passes through a period of zero magnetic reversal. However, as the electron beam enters the collector region 22, the magnetic field imparts an unwanted magnetic effect on the electron beam as it enters the chamber of the collector. This magnetic field reversal is undesired at this point because, as set forth above, it is desirable that at this point in the electron beam path, all magnetic fields be removed so that the natural electronic field dispersion of the electrons can be effected within the opening in the collector so that the electrons can be evenly dispersed on the inside surface of the collector.

Figure 7:
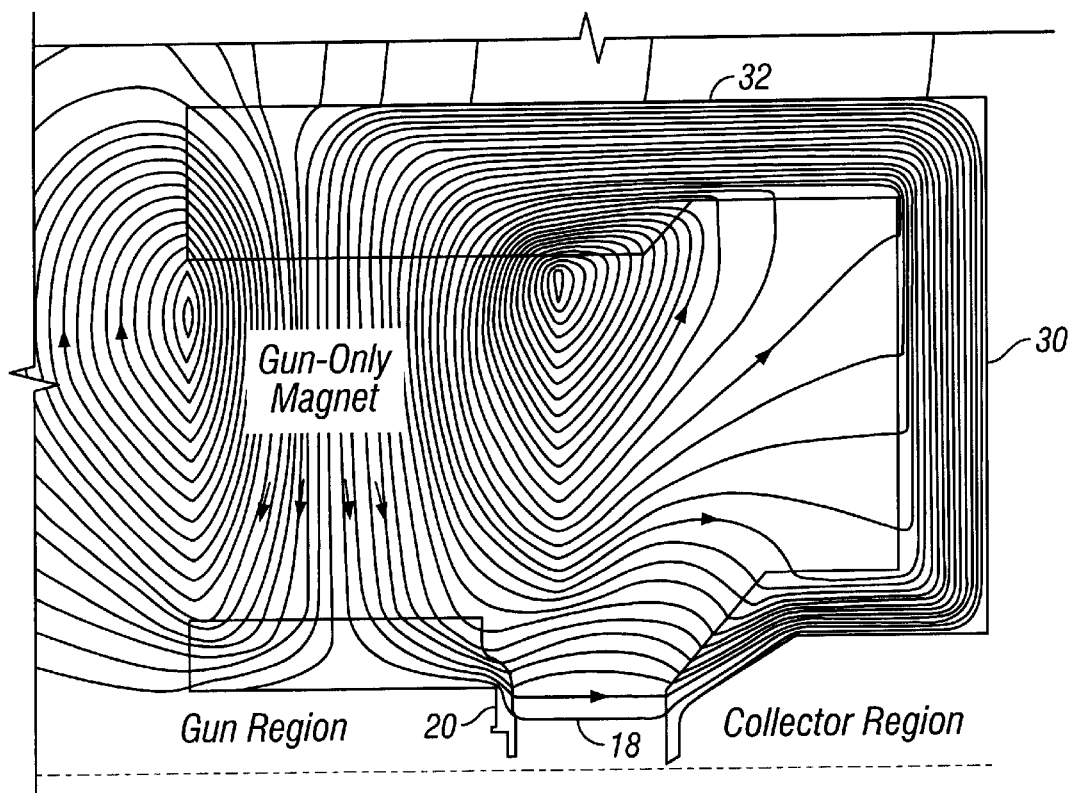
FIG. 7 is a schematic diagram of a section through a gun-only permanent magnet system in accordance with the present invention.

FIG. 7 of the present invention shows a similar drawing to that of FIG. 5, except now there is magnetic material at the collector region 30 of the permanent magnet 32. This magnetic material eliminates the effects of any flux reversal which appeared and was described above conjunction with FIGS. 5 and 6. In FIG. 7, the magnetic field lines are terminated into the magnetic metal of the magnet at collector region 30.

Figure 8:
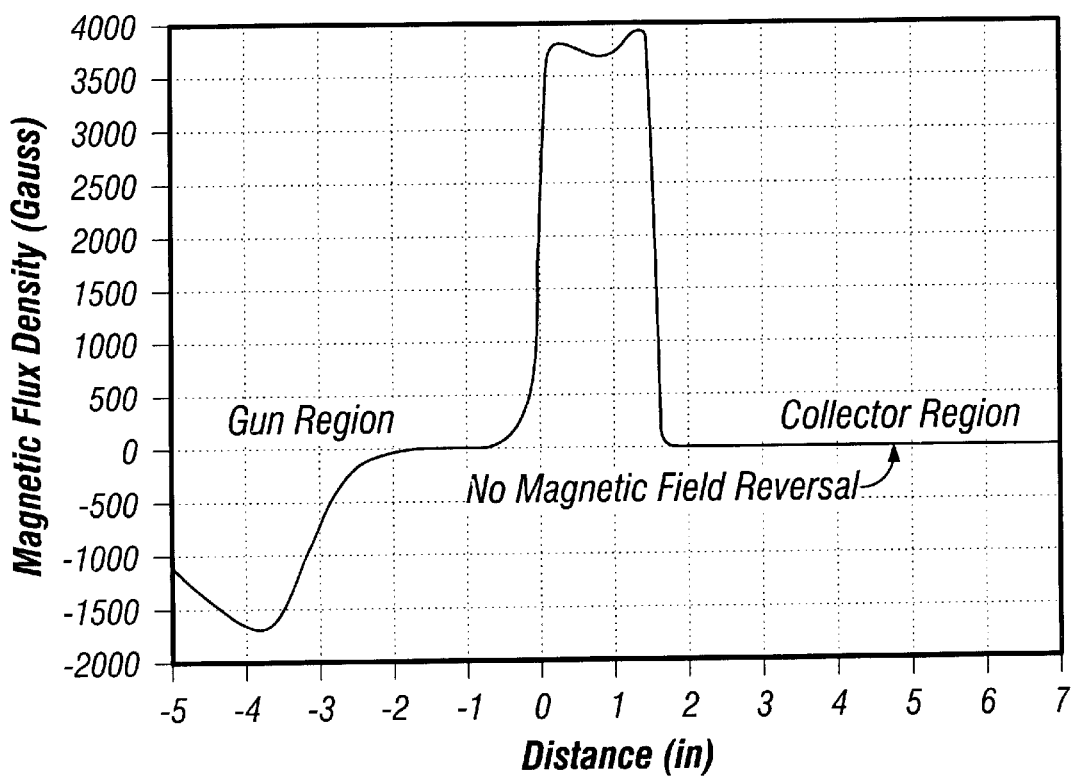
FIG. 8 is a drawing of magnetic flux density versus distance along the centerline of the axis of a gun-only permanent magnet on-axis klystron tube as described in conjunction with FIG. 3.

As the electron beam passes by the magnetic field 18 at the active opening 20 of the permanent magnet 32, it is seen in FIG. 8 that no magnetic field reversal is present now at the collector region 30 of the tube because of the closed portion of the magnet. This is highly desirable, as set forth above, because the electrons now are free to disperse within the opening in the collector to more evenly disperse the heat and to more accurately recover the kinetic energy of the electrons. See FIG. 3.

Figure 9:
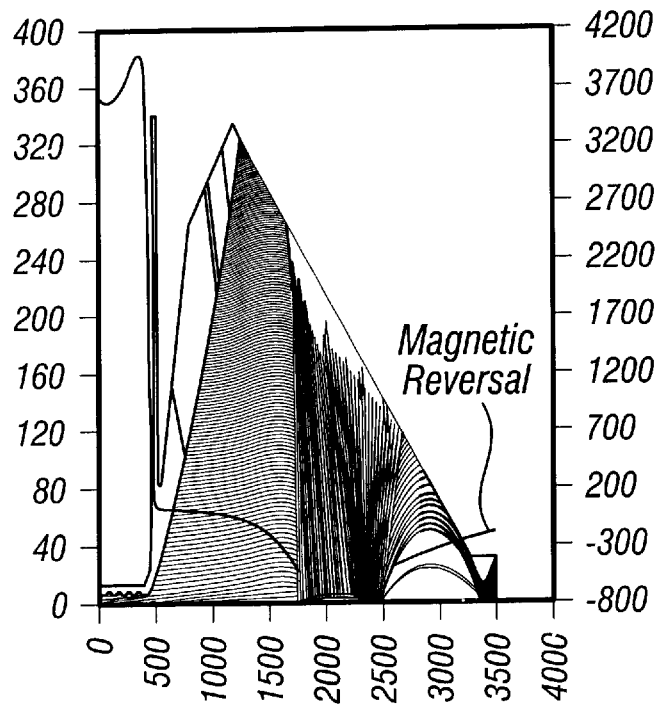
FIG. 9 is a drawing simulation of electrons entering the collector region in the presence of a magnetic field reversal for a system as set forth in conjunction with FIG. 1.

FIG. 9 is a simulation of electrons entering the collector region in the presence of a magnetic field reversal system. This figure shows the magnetic field reversal and its effect on the electron field as it enters a single chamber high energy tube collector. Again, the horizontal radius is the centerline of the high energy tube and the figure is only a slice through the upper part of the collector chamber. In actuality, FIG. 9 would be three-dimensional and occupy a space below the centerline as well as above, and in the circular shape in viewing the electron tube along the centerline itself. Some electrons do not make it to the walls of the collector region and are refocused by the magnetic flux reversals. Those that do not make it to the wall of the collector chamber may be focussed once before collection. These particles would cross the centerline at least once. Some electrons would be refocused twice and cross the centerline twice before being collected. The plot in FIG. 9 shows many of the electron particles, some crossing the center line axis once and others many times.

FIG. 10 is a simulation of electrons entering the collector region in the absence of a magnetic field reversal by the use of a gun only magnet in accordance with the principles of the present invention. That is, since there is no magnetic flux reversal in this figure, the electrons, as they enter the collector region chamber, are dispersed in accordance with the natural electrostatic repulsion of one electron to the other; and the electrons impinge on the wall of the collector chamber in a more or less even manner. This allows for an even dispersion of the heat energy and decreases the amount of hot spots and pitting caused by the electron impingement in the collector.

Figure 11:
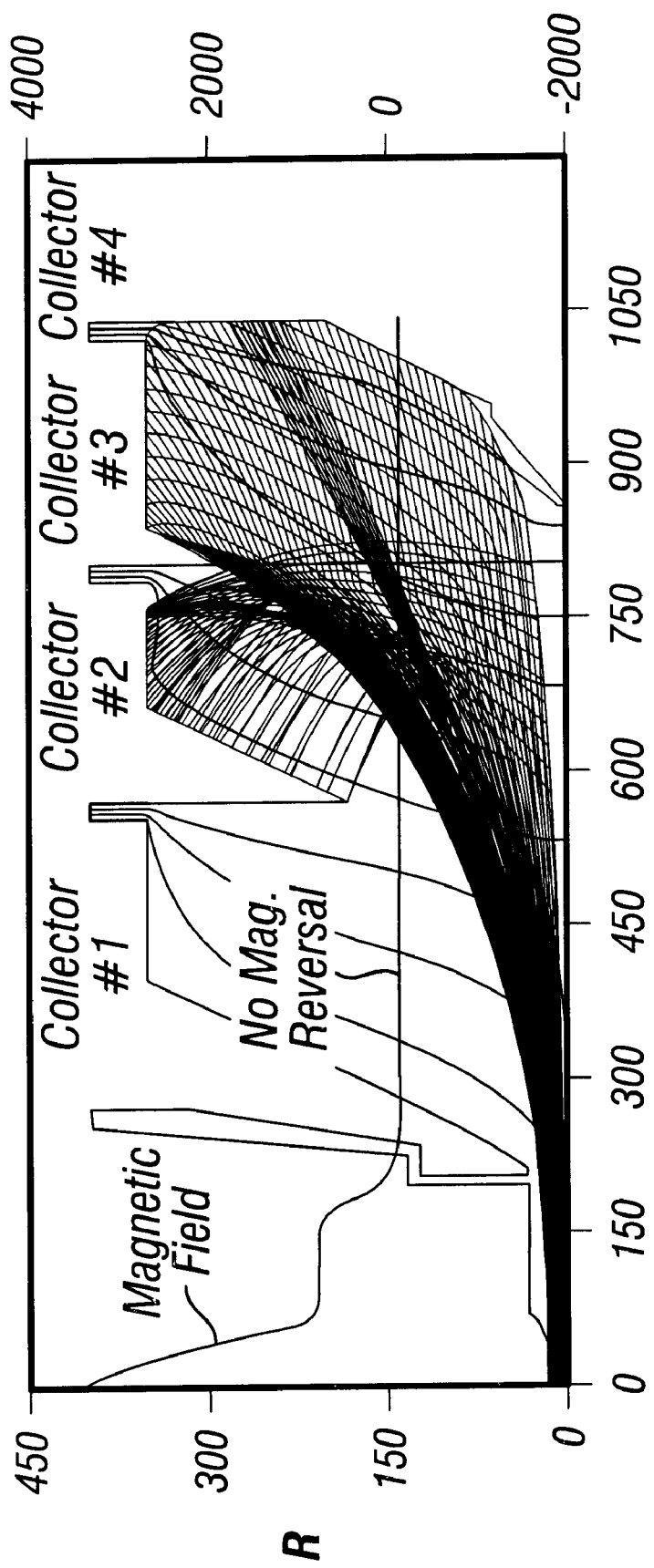
FIG. 11 is a drawing simulation of the electrons entering the collector region in the absence of a magnetic field reversal in a gun-only permanent magnet system utilizing a multistage depressed collector.

FIG. 11 is a simulation of electrons entering the four stage multistage depressed collector. As shown in FIG. 11, the electrons enter from the left, as the centerline of the tube is shown as the horizontal axis in the figure. The vertical axis is the dimension of the actual copper forming the various four stages of the multistage depressed collector. The magnetic field is seen, as well. The equal potential lines are seen and the magnetic field lines at collector stages 1, 2, 3, and 4 are horizontal indicating no flux reversal. Thus, the pattern of the electrons impinging upon the various stages of the collector in this multistage depressed collector is even as intended so that the heat is more adequately dispersed and the problem of hot spots is eliminated.

While embodiments and applications of this invention have been shown and described, it will be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A ground based satellite or terrestrial communications system utilizing a high power output vacuum electron device, said vacuum electron device comprising a klystron having a multistage depressed collector that is free of magnetic field reversals.

2. The system as set forth in claim 1 wherein said klystron is an extended interaction klystron.

3. The system as set forth in claim 2 wherein adjacent RF assemblies are spaced from said klystron to avoid any magnetic interference that may cause an increase in klystron body current.

4. The system as set forth in claim 3 further including a power supply for supplying power to said klystron, and a control system for controlling the operation of said power supply control system and said klystron.

5. The system as set forth in claim 4 wherein said power supply and said control system continue to operate even if transient high-energy arcs occur in said klystron collector.

6. The system as set forth in claim 5 wherein said power supply remains stable and regulated regardless of the wide range of collector loads in said klystron.

7. A ground based satellite or terrestrial communications system, comprising:
    a klystron with a multistage depressed collector that is free of magnetic field reversals;
    a power supply for supplying power to said klystron; and
    a control system for controlling the operation of said ground based satellite or terrestrial communications system, said power supply, and said klystron.

8. The system as set forth in claim 7 further including a predistortion linearizer for use with said klystron for linearizing the output of said power supply.

9. The system as set forth in claim 8 further including a block upconverter, said block upconverter accepting radio frequency (RF) input at an intermediate frequency (IF) and of converting the IF frequency to the microwave frequency for amplification by said klystron.

10. The system as set forth in claim 9 further including:
    an electronic control for the beam voltage to said klystron, said electronic control allowing beam voltages lower than nominal to decrease power consumption when said klystron is not being operated at full output power.

11. The system as set forth in claim 10 wherein the beam voltage is based on a fixed output backoff which automatically adjusts the beam voltage based on an RF input drive level.

12. A ground based satellite or terrestrial communication system utilizing a high power output klystron, said klystron comprising:
    an electron gun operable to emit electrons;
    a gun magnet enveloping at least a portion of the electron gun operable to focus the electrons into an electron beam;
    an RF interaction region operable to modulate and amplify the electron beam; and
    a collector coupled to the RF interaction region, said collector having a collector chamber being free of magnetic field reversals and having a surface configured to disperse and collect the electron beam received from the RF interaction region.

13. The system of claim 12, further comprising a tube of magnetic material coaxially arranged around a centerline of the electron beam, said tube having a first end coupled to the gun magnet and a second end coupled to the collector, said tube operable to prevent magnetic fields from entering into the collector chamber.

14. The system of claim 12 wherein the collector chamber is a multiple stage depressed collector.

15. The system of claim 12, further comprising:
    a power supply configured to supply power to the klystron; and
    a control system operable to control the operation of the klystron and the power supply.

16. A ground based satellite or terrestrial communication system utilizing a high power output klystron, said klystron comprising:
    cathode means for emitting electrons;
    gun magnet means for focusing electrons from the cathode means into an electron beam;
    RF interaction means for modulating and amplifying the electron beam; and
    collector means coupled to the RF interaction means for dispersing and collecting the electron beam from the RF interaction means and for preventing magnetic field reversals within the collector means.

* * * * *

UNITED STATES PATENT AND TRADEMARK OFFICE
CERTIFICATE OF CORRECTION

PATENT NO.    : 6,552,490 B1
DATED         : April 22, 2003
INVENTOR(S)   : Michael J. Cascone and Eric Oiesen It is certified that error appears in the above-identified patent and that said Letters Patent is hereby corrected as shown below:

Column 1,
Line 14, after "Device" insert -- " --.
Line 14, after "6,456,009" delete " " ".

Column 4,
Line 1, delete "of".

Column 8,
Line 4, after "magnet" insert -- 10 --.

Signed and Sealed this

Sixteenth Day of September, 2003

JAMES E. ROGAN
*Director of the United States Patent and Trademark Office*